(12) United States Patent
Macleod

(10) Patent No.: US 10,749,567 B2
(45) Date of Patent: Aug. 18, 2020

(54) METHOD AND APPARATUS FOR THE RECEPTION OF A SIGNAL

(71) Applicant: QINETIQ LIMITED, Farnborough, Hampshire (GB)

(72) Inventor: Malcolm David Macleod, Malvern (GB)

(73) Assignee: QINETIQ LIMITED, Hampshire (GB)

(*) Notice: Subject to any disclaimer, the term of this patent is extended or adjusted under 35 U.S.C. 154(b) by 0 days.

(21) Appl. No.: 16/318,423

(22) PCT Filed: Jul. 27, 2017

(86) PCT No.: PCT/EP2017/069076
§ 371 (c)(1),
(2) Date: Jan. 17, 2019

(87) PCT Pub. No.: WO2018/019960
PCT Pub. Date: Feb. 1, 2018

(65) Prior Publication Data
US 2019/0268036 A1    Aug. 29, 2019

(30) Foreign Application Priority Data

Jul. 28, 2016  (GB) .................................... 1613075.9
Jan. 5, 2017   (GB) .................................... 1700133

(51) Int. Cl.
H04B 1/7075   (2011.01)
G01S 19/29    (2010.01)
(Continued)

(52) U.S. Cl.
CPC ............ *H04B 1/7075* (2013.01); *G01S 19/29* (2013.01); *G01S 19/30* (2013.01); *H04B 1/7073* (2013.01);
(Continued)

(58) Field of Classification Search
CPC .................................................. H04B 1/7075
(Continued)

(56) References Cited

U.S. PATENT DOCUMENTS 5,872,810 A * 2/1999 Philips ................... H04B 1/707
                                                375/130
6,407,699 B1 * 6/2002 Yang ....................... G01S 19/21
                                                342/357.59
(Continued)

FOREIGN PATENT DOCUMENTS

CN     202600153 U    12/2012
WO     02/11348 A2     2/2002
(Continued)

OTHER PUBLICATIONS

Nov. 24, 2017 International Search Report issued in International Patent Application No. PCT/EP2017/069076.
(Continued)

*Primary Examiner* — Lihong Yu
(74) *Attorney, Agent, or Firm* — Oliff PLC

(57) ABSTRACT

A method for the reception of a frequency hopped direct sequence spread spectrum signal includes acquiring the signal by splitting the received signal into a plurality of processing sub-channels, each corresponding to one or more hop frequencies; and within each sub-channel: i) subtracting any sub-carrier frequency from the received signal; ii) filtering the signal from (i) using a chip-matched filter; iii) selecting a sub-set of samples from the filtered signal; iv) correlating the sampled signal from step (iii) with a known reference signal to produce at least one correlator output. The output(s) from each sub-channel are provided to an input of a corresponding one or more common discrete time Fourier transforms (DTFT), and an output therefrom having a peak above a predetermined threshold is selected for further processing in the receiver. The method is a less (Continued)

expensive way of tracking the signal and can demodulate appropriately modulated signals.

20 Claims, 4 Drawing Sheets

(51) Int. Cl.
- *G01S 19/30* (2010.01)
- *H04B 1/7136* (2011.01)
- *H04B 1/7073* (2011.01)
- *H04B 1/7156* (2011.01)

(52) U.S. Cl.
CPC . *H04B 1/7136* (2013.01); *H04B 2001/71563* (2013.01)

(58) Field of Classification Search
USPC .......................................................... 375/150
See application file for complete search history.

(56) References Cited

U.S. PATENT DOCUMENTS

| | | | |
|---|---|---|---|
| 2004/0260506 A1* | 12/2004 | Jones ........................ | G01S 1/08 702/150 |
| 2009/0109091 A1* | 4/2009 | Thind ..................... | G01S 19/24 342/357.63 |
| 2009/0279588 A1* | 11/2009 | Mochizuki ............. | H04B 1/713 375/137 |
| 2012/0195401 A1* | 8/2012 | Becker ................... | H04L 7/042 375/368 |
| 2015/0195670 A1 | 7/2015 | Agee | |
| 2015/0236751 A1 | 8/2015 | Floch et al. | |

FOREIGN PATENT DOCUMENTS

| | | |
|---|---|---|
| WO | 2005/088853 A1 | 9/2005 |
| WO | 2015/107111 A1 | 7/2015 |

OTHER PUBLICATIONS

Nov. 24, 2017 Written Opinion issued in International Patent Application No. PCT/EP2017/069076.

Weining Song et al. "Novel Fast Acquisition Algorithm for DS/FH System". Business Management and Electronic Information (BMEI), 2011 International Conference on, IEEE, May 13, 2011, pp. 460-462.

D.M. Frai et al. "Fast Acquisition CDMA Receiver for Burst Transmission System". Electronics, Circuits, and Systems, 2004. ICECS 2004. Proceedings of the 2004 11th IEEE International Conference on Tel Aviv, Israel, Dec. 13-15, 2004, Piscataway, NJ, USA, IEEE, Dec. 13, 2004, pp. 342-345.

Zhihui Zhou et al. "CBFH: Coherent Binary Frequency-Hopping Multiplexing for Beidou B2 Signal". China Satellite Navigation Conference (CSNC) 2014, pp. 37-40, 43, and 44, Proceedings, vol. II, Lecture Notes in Electrical Engineering 304, Springer-Verlag Berlin Heidelberg 2014.

M.K. Sust et al. "Rapid Acquisition Concept for Voice Activated CDMA Communication". Globecom 90, Dec. 1990, pp. 1820-1826.

Paul M. Baggenstoss. "On Detecting Linear Frequency-Modulated Waveforms in Frequency- and Time- Dispersive Channels: Alternatives to Segmented Replica Correlation". IEEE Journal of Oceanic Engineering, vol. 19, No. 4, Oct. 1994, pp. 591-598.

Mohammad Zahidul H. Bhuiyan et al. "Multipath Mitigation Techniques for Satellite-Based Positioning Applications". Global Navigation Satellite Systems: Signal, Theory, and Applications, Prof. Shuanggen Jin (Ed.), 2012, ISBN: 978-953-307-843-4, InTech, Chapter 17, pp. 405-426.

May 12, 2017 Search Report issued in British Patent Application No. 1700133.0.

James Eric Dunn, "Detection and Classification of Frequency-Hopped Spread Spectrum Signals", Iowa State University, 1991.

Richard Poisel, Electronic Warfare Receivers and Receiving Systems, Artech House, Boston/London, Chapter 18 ("Receivers for Frequency Hopped Spread Spectrum Intercept"), pp. 673-710, 2014.

Richard Poisel, Electronic Warfare Receivers and Receiving Systems, Artech House, Boston/London, Chapter 19 ("Receivers for Time-Hopped Spread Spectrum Intercept"), pp. 711-731, 2014.

Fei Gong, "Front End Circuit Module Designs for a Digitally Controlled Channelized SDR Receiver Architecture" (dissertation), Ohio State University, 2011.

Phillip L. De Leon, "On the Use of Filter Banks for Parallel Digital Signal Processing", New Mexico State University, 7th NASA Symposium on VLSI Design, 1998.

* cited by examiner

METHOD AND APPARATUS FOR THE RECEPTION OF A SIGNAL

This invention relates to receivers, particularly those used for receiving complex modulated signals, such as frequency hopping signals, and signals that are spread in frequency using a spreading code.

It is commonplace in modern signals to use spread spectrum techniques, including frequency diversity techniques such as frequency hopping, and spreading codes, to achieve efficiencies in spectrum usage. For example, the former is used in GSM, and the latter used in CDMA mobile telephone transmission protocols and GNSS systems.

With both techniques, there is a requirement for a receiver, on initial reception of signals of interest, to first acquire the signal (i.e. to establish the current temporal location within the hopping sequence or the spreading code). Following acquisition, the signal must then be tracked, to retrieve the message being broadcast by the signal, or to measure timing variations in the signal.

It is quite possible to use both techniques simultaneously. For example, the possibility of using frequency hopping in addition to spreading codes in future GNSS signals has been described in the paper "CBFH: Coherent Binary Frequency-Hopping Multiplexing for BeiDou B2 Signal" authored by Z. Zhou, J. Wei, Z. Tang, T. Yan and X Xia, published in: J. Sun et al. (eds,), China Satellite Navigation Conference (CSNC) 2014, p. 37, Proceedings, Volume II, Lecture Notes in Electrical Engineering 304, Springer-Verlag Berlin Heidelberg 2014. However, the receiver complexity, and processing effort required also increases. The receiver will have its own copies of the known transmitted spreading code, and will also know the frequency hopping pattern. However, as said above, before acquisition has been performed, it will not know where in the hopping sequence or the code the received signal is. In some applications, there will also be other issues that complicate reception further. Doppler frequency changes in the received signals, caused by relative movement of the receiver or the transmitter are one such issue. "Doppler-like" frequency errors caused by imperfections in the receiver local oscillator (LO) are another. The acquisition process therefore comprises of a search, across time and, in some applications frequency (due to the Doppler variations), for the wanted signal. This is usually done using a correlation process of some kind, where the received signal is correlated with the local copies of the known signal (the "reference signal").

In a radio transmission system the transmitter generates an information-bearing signal and then modulates it onto a "carrier wave" with carrier frequency, $f_{CARR}$. The first stages of the radio receiver then subtract this carrier frequency from the received signal. It will be appreciated by the normally skilled person that the analysis of such radio systems can be carried out by analysing the "baseband" signals (that is, the signal in the transmitter before it is frequency shifted to the carrier frequency, and the signal in the receiver after the carrier frequency has been subtracted again). The effects of the radio transmission process are then modelled as (in the simplest case) an unknown propagation delay, amplitude change and phase shift, and the addition of noise. This is the approach which is followed below.

The process of correlation will be described in the digital domain, in which all signals are represented as streams of sample values. The transmitter is assumed to have transmitted a known reference signal of L samples in duration, $$c_k, k=0, \ldots, L-1. \tag{1}$$

This signal is delayed by the transmission process, and modified by an unknown amplitude change and phase shift, and noise is also added to it. The resulting input signal at the receiver is given by $$s_{n+1-L+k} = a\, \exp(j\phi) c_k + v_{n+1-L-k}, k=0, \ldots, L-1. \tag{2}$$

where $v_n$ is the noise present in sample n, a is the unknown amplitude of the received signal and $\phi$ is the phase shift angle in radians. In equation (2) the final sample of the known reference signal arrives at sample time n.

If frequency offset is ignored, the task of the correlator at sample time m is to compute the following output:

$$C_m = \sum_{k=0}^{L-1} c_k^* s_{m+1-L+k}, \tag{3}$$

where * means the complex conjugate operation, and $s_m$ is the received signal sample at time m.

Because the time at which the known reference section of the input signal arrives at the receiver is unknown, the correlator, once started, is made to perform this computation repeatedly until (at some sample time, say $m_1$) the magnitude of the correlator output exceeds a predetermined threshold. At this point the reference signal is said to have been detected, and its time of arrival is estimated to be sample time $m_1$). For the received signal described by equation (2), this should occur at sample time $m_1=n$.

Consider the case in which correlation as described above is performed at a sample time (n+p) different from the actual time of occurrence of the reference signal in the received input (that is, sample n). Ignoring noise, the relationship between the correlator output, $C_{n+m}$, and sample time offset p relative to the actual time of occurrence of the reference signal is known as the Autocorrelation Function (ACF) of the reference signal, notated $C_{pp}$. The magnitude of the ACF is largest when p=0 and reduces as p increases in magnitude (positive or negative), with the consequence that the correlator output is reduced. That in turn reduces the probability of correctly detecting the presence of the reference signal. To ensure that the reduction in detection probability is acceptably small, the worst case (i.e. largest) value of p which may be allowed to occur must be kept sufficiently small. This is achieved by ensuring that the time interval between correlations is made sufficiently small.

It is often the case that the reference signal comprises a succession of individual pulses, often known as "chips", each chip being multiplied by one of a small number of values; often just two values are chosen to be used, +1 and −1. The stream of multiplying values is known as the spreading code, and is typically a Pseudo Random (PR) code, which is a stream of values having similar characteristics to a random stream of values. Then if for example each chip is a rectangular pulse, the shape of the ACF is triangular, with width (at half the peak height) equal to the chip duration. Based on this width, the time interval between correlations is typically chosen to be between 0.25 and 0.5 times the chip duration in order to ensure a sufficiently small loss of detection probability. If the chosen sample rate in the receiver is much greater than the rate at which successive chips are transmitted (which is often the case) then the time interval between correlations may be more than one sample. For example if each chip is a rectangular pulse of length 1 µs and the sample rate is 10 MHz, correlations need to be carried out only at intervals of 3 to 5 samples.

In that case a further saving of computation load is possible using a method described in International patent application No. WO2015/107111, the contents of which are hereby included by reference. In this method the input signal is first filtered using a filter having a response matched to one chip, referred to as a Chip Matched Filter (CMF). The mathematical description of such a filter is as given in equation (3), but with the values $c_k$ now replaced by the sample values required to represent just one chip, and the value L replaced by the number of samples required to represent just one chip. For example if each chip is a rectangular pulse of length 1 μs and the sample rate is 10 MHz, the value of L is 10 samples, and the ten sample values $c_k$ are all equal to one.

Next, to perform a single correlation, the output of the CMF is sampled at intervals equal to the time spacing between successive chips. If the receiver is designed in such a way that the sample rate is an integer multiple of the chip rate, say P times the chip rate, then this means that only every $P^{th}$ sample is taken from the filter output. For example if the chip rate in the numerical example above is 1 chip per 1 μs, then every $10^{th}$ sample is taken from the filter output. These selected filter outputs are then correlated with the reference pattern (that is, the pattern of multiplying values which was used to multiply the chip values to generate the reference signal).

Alternatively if the receiver sample rate is chosen not to be an integer multiple of the chip rate, then as described in WO2015/107111 a sample selection unit (SSU) may be arranged to receive outputs from the matched filter and to select, for input to each tap of the correlator, the sample nearest in time to a desired ideal time in relation to a timing reference point on each chip.

As explained above, correlations are generally computed at delay intervals of typically 0.25 to 0.5 times the chip duration, in order to accomplish the acquisition search process with acceptably low loss. A way to implement this repeated correlation efficiently is to first use the SSU to select samples from the matched filter output at a mean rate equal to the chosen rate of correlations (for example 2, 3 or 4 times the chip rate) and store those samples in a buffer. Then to perform each correlation, the correlator draws samples from the buffer whose sample times correspond as closely as possible to a spacing of one sample per chip.

In this method the correlation part of the process subsequent to the CMF has a computation load smaller by a factor of P, than in the original correlator. Since this part of the process dominates the overall computation load, that in turn is smaller by a factor of nearly P.

As explained above, the received signal may be shifted in frequency because of Doppler shift or oscillator frequency errors. If this frequency shift equals $f_D$ Hz, the received signal is modified from equation (2) to $$s_{n+1-L+k} = a\ \exp(j\phi)\exp(j2\pi k\ f_D/f_S)c_k + v_{n+1-L+k},\quad (4)$$

Where $f_S$ is the sampling frequency.

This causes the magnitude of the correlation output to be reduced by the factor $$\gamma = \frac{\sin(\pi L f_D/f_S)}{L \sin(\pi f_D/f_S)}. \quad (5)$$

Such a reduction in the correlation output reduces the probability of successfully detecting the wanted signal, so it should be avoided. A simple method for doing this is to implement a multiplicity of correlators, each adapted to correlate with the input signal when it is assumed to have a different frequency offset. If the frequency offset $f_D$ were known to have a specific value $f_A$, then ideal performance could be restored by applying that same frequency shift to the correlator reference signal, replacing $c_k$ with $$c_k^A = \exp(j2\pi k\ f_A/f_S)c_k,\ k=0,\ldots,L-1. \quad (6)$$

Alternatively, the correlator reference signal may be left unchanged, but the signal input to the correlator may be frequency shifted by the amount required to cancel the known frequency shift of the signal, as follows $$s_n^A = \exp(-j2\pi n\ f_A/f_S)s_n. \quad (7)$$

In either case, unimpaired operation equivalent to (4) is restored.

However $f_D$ is not known. A possible solution is to implement a multiplicity of correlators, each having a different frequency shift $f_A$, for example taking the following values which are uniformly spaced between $f_{MIN}$ and $f_{MAX}$, at frequency steps of $f_{STEP}$:

$$f_A = \{f_{MIN},\ f_{MIN}+f_{STEP},\ f_{MIN}+2f_{STEP},\ f_{MIN}+ \\ 3f_{STEP},\ldots,f_{MAX}-2f_{STEP},\ f_{MAX}-f_{STEP},\ f_{MAX}\}. \quad (8)$$

At each sample time n, the magnitudes of the outputs from all these correlators are computed and the maximum of those magnitudes is selected.

The output of a correlator with frequency offset $f_A$ when the actual input frequency offset is $f_D$ is given by equation (5) but with the frequency shift $f_D$ replaced by the residual error in frequency, $f_{ERR}=f_D-f_A$. Therefore ignoring the effects of noise, the correlator which gives the maximum output magnitude is the one for which $f_{ERR}$ has the smallest magnitude. That is the one whose frequency offset is closest to that of the actual frequency offset of the signal. The greatest loss of performance occurs when the magnitude of $f_{ERR}$ is largest, which is when the true frequency offset of the input signal lies half way between the frequency offset values of two of the correlators. The magnitude of $f_{ERR}$ is then $f_{STEP}/2$, so the resulting worst case loss in gain (i.e. smallest gain factor) is $$\gamma_{WORST} = \frac{\sin(\pi L\ 0.5 f_{STEP}/f_S)}{L \sin(\pi\ 0.5\ f_{STEP}/f_S)}. \quad (9)$$

Hence $f_{STEP}$ may be chosen to ensure that the maximum loss of performance, determined by $\gamma_{WORST}$, is acceptable.

The number of correlators that is needed in this approach depends on
- the acceptable loss in gain (smaller loss requires more correlators),
- the range of unknown Doppler frequency ($f_{MAX}-f_{MIN}$), and
- the length L of the reference sequence.

The length L of reference sequence required is in turn dependent on the Signal to Noise power ratio (SNR) at the receiver input, becoming larger if the receiver is required to perform signal acquisition at lower SNR.

Simply increasing the number of correlators has the undesirable consequence of requiring more computational power, and hence more circuitry and greater electrical power consumption. To avoid these disadvantages, efficient ways to perform the necessary computation have been defined. One such method, which we refer to as "segmented correlation" has been described (under the name "Swivelling Matched Filter") in the paper "Rapid Acquisition Concepts for Voice Activated CDMA Communication" authored by M Sust, R Kaufman, F Molitor and A Bjornstor, published in Globecom 90, pp. 1820-1826, December 1990.

In this method the Reference Sequence is divided into M subsections each of length B (where MB must be at least L, to encompass the whole Reference Sequence). The correlation process (as described in equation (2), in other words not frequency shifted) is then broken into M subcorrelations, each producing one output. Each subcorrelation multiplies only B samples of the input with the corresponding B samples of the reference signal.

These M subcorrelator outputs are then further combined as illustrated in FIG. 1, taken from the above paper. In the figure the subcorrelators are labelled MF0, MF1 etc, and the combining process is labelled "Complex FFT or DFT"

The processes labelled "( )²+( )²" along the bottom of the figure compute the squared magnitude of each complex output of the combiner (that is, $I^2+Q^2$, where I and Q are the real and imaginary parts of the complex output).

As explained in the paper, the outputs from this architecture are approximately equivalent to those from a set of M separate correlators, each having a different frequency shift $f_A$, where the values of $f_A$ are $$f_{Ak}=k(f_S/MB), \text{ for } k=-M/2, \ldots (M/2)-1 \quad (10)$$

The frequency spacing between these frequency-shifted correlators therefore has the value $f_{STEP}=(f_S/MB)$. This leads to a value of $\gamma_{WORST}$ which is typically too low (leading to too great a performance loss). To overcome this problem the function "FFT or DFT" may be replaced by a process named the Discrete Time Fourier Transform (DTFT). In the DTFT, the frequency spacing $d_{STEP}$ between outputs may be chosen arbitrarily; in particular, it may be chosen to be smaller than $(f_S/MB)$, leading to smaller worst case loss of performance. It will be appreciated by the normally skilled person that there are several ways to implement such a DTFT, including the use of a zero-padded FFT, or the use of the CORDIC algorithm.

All the correlation methods described above are known as "coherent". There are also "incoherent" methods, which have the advantage of reduced computation load. One example of such a method is the segmented replica correlator, described in the paper "On Detecting Linear Frequency-Modulated Waveforms in Frequency- and Time-Dispersive Channels: Alternatives to Segmented Replica Correlation" authored by Paul M. Baggenstoss and published in IEEE Journal of Oceanic Engineering, Vol. 19, No. 4., October 1994, page 591. In this approach the correlation process is again performed as a series of subcorrelations, as already described, but there is no DTFT combining process. Instead the squared magnitudes of the subcorrelator outputs are simply added together, giving a single output value. However the disadvantage of incoherent methods is poorer detection performance—as a result, to achieve any given probability of detection they require a higher Signal to Noise power ratio (SNR) of the received signal.

The prior art techniques described above are for signals which are spread-spectrum through the use of spreading codes, but not through the use of frequency hopping. Frequency hopping techniques are well known in communications; and in some cases frequency hopping and spreading codes are both used.

For such signals the shape and width of the ACF peak are principally related not to the chip rate, but instead to the bandwidth (frequency spread) of the frequency hopping (FH). The width of the ACF peak (at half the peak height) is approximately equal to the reciprocal of this bandwidth. Based on this width, the time interval between correlations for the purpose of acquisition should typically be chosen to be between 0.25 and 0.5 times the reciprocal of the FH bandwidth, in order to ensure a sufficiently small loss of detection probability.

A consequence of this for the acquisition of such signals is that correlations must be computed at a much higher rate (because the FH bandwidth is much larger than the chip rate). Also, the rate at which the input signal must be sampled is much higher (it is again proportional to the FH bandwidth rather than the chip rate). If the correlations are computed in the conventional way, as described above, the combined consequence of these two effects is that the overall computational load is increased in proportion to the square of the ratio of the FH bandwidth to the chip rate. This is a potentially serious difficulty for high bandwidth signals.

It is an aim of the present invention to process signals which are both frequency-hopped and multiplied by spreading codes with reduced computation load.

According to a first aspect of the invention there is provided a method for processing a signal in a receiver, the signal comprising of a frequency hopped sequence of chips, and the method comprising the steps of:

a) splitting the received signal into a plurality (k) of separate processing sub-channels, each corresponding to one or more hop frequencies;

b) within each sub-channel:
  i) subtracting any sub-carrier frequency from the received signal;
  ii) filtering the signal from (i) using a chip-matched filter (CMF);
  iii) selecting a sub-set of samples from the filtered signal;
  iv) correlating the sampled signal from step (iii) with a known reference signal to produce at least one correlator output;

c) providing an output from each sub-channel into an input of at least one common discrete time Fourier transform (DTFT);

d) selecting one or more outputs of the common DTFT of stage (c) having a peak above a predetermined threshold for further processing in the receiver.

The invention allows, in its most basic form, a means for processing a signal, for example to acquire it as explained above, that has reduced processing requirements.

Advantageously, the signal is digitised before being processed as described above in steps (a) to (d). Thus, the above process will occur completely in the digital domain. It will be appreciated by the normally skilled person that the initial digitisation will need to be done at a rate that captures the information throughout the whole bandwidth of the frequency hopped signal. It will further be appreciated that, within each sub-channel, the bandwidth will be lower, and hence the processing within the channel may generally be done at a lower sampling rate, commensurate with the bandwidth of that particular channel. The reduction in sample rate is thus carried out at step (b)(iii), following the CMF. It will be appreciated that the CMF and the subsequent selection of a sub-set of the samples output from the CMF together constitute a decimation process.

It will be further appreciated that, as the signal is a frequency hopped signal, only one sub-channel will have a valid signal at any one point in time. This can be exploited to reduce processing effort during tracking of the signal (i.e. after the signal has first been acquired) because the receiver will know which sub-channels are in receipt of a valid signal during any chosen time interval. Thus, processes associated with sub-channels which are not currently processing a valid signal can be shut down until required. Of course, during acquisition, it is not known whether a particular sub-channel has valid data or not, and so all sub-channels will be kept active.

Conveniently, in some applications, particularly when acquiring the signal, the samples from step iii) may be stored in a buffer, comprising a memory store arranged to hold a sequence of samples. During acquisition of the signal, the correlation process of step b(iv) may comprise sequentially correlating the samples in the buffer with a reference signal in a sliding window, wherein the window moves by one sample (losing the earliest sample, and being updated with the latest sample) for each correlation performed.

The subtraction of the carrier frequency of step (a) (which may be described as "sub-carrier wipeoff") will preferably bring the input signal to be symmetric about zero Hz within the sub-channel. Each sub-channel may be chosen to process a single hop frequency, or may be chosen to process two or more hop frequencies, in which case the carrier frequency subtracted is assumed to be at a mean of the hop frequencies processed.

The reference signal used in the correlator in each sub-channel is constructed based upon the expected signals within that sub-channel. Where each sub-channel is chosen to process a single hop frequency, and the sub-carrier wipeoff exactly cancels the hop frequency shift that was applied to the original reference signal, then no frequency shift of the reference signal input to the sub-channel correlator is required. However, in other cases the reference signal may be frequency shifted to match the residual sub-channel input signal frequency, following the subtraction of the sub-carrier frequency, to account for hop frequencies that are not at zero Hz after the subtraction process.

As explained above, the processing steps taken when acquiring the channel input signal differ from those when tracking the signal. Variations in each will now be discussed.

Acquisition

During acquisition, the correlator in each sub-channel comprises a buffer that stores samples from step (iii) over a time period. The time period is chosen according to system requirements such as the required processing gain needed to extract a suitably strong signal (favouring a longer buffer), and the processing effort involved in the correlation (favouring a shorter buffer). Such a trade-off will be readily appreciated by the normally skilled person. Advantageously, a segmented correlation approach may be used as described above. In this approach, the buffer is processed as a set of contiguous segments, each holding a plurality of contiguous samples, where the samples in each segment are arranged to be correlated with a corresponding part of the reference signal.

The segment size may be chosen based upon factors such as the maximum desired phase error (caused by unknown frequency offsets in the signal) across the time period of samples stored within the segment. It will be appreciated that, due to the frequency hopped nature of the signal, many of the segments will not be expected to contain a valid signal (as determined by the presence of the known reference signal), and hence during any single correlation these segments can be ignored (i.e. no sub-correlation performed in such segments). This saves processing power. The sub correlation within a segment only needs to be done while the reference signal is present. In general, the starts and ends of the hops (i.e. the time spans during which the input signal remains at a given frequency before hopping to the next), are not time-aligned with the correlator segments. The sub-correlation therefore may conveniently feed zeroes in to the correlation process for the periods that no reference signal is present, thus effectively ignoring the input signal at these times. This again saves processing power.

In each sub-channel, the segment correlation results (including any that are zero because there was no hop in that sub-channel during that segment) are provided as inputs to a sub-channel DTFT. Each sub-channel DTFT provides M outputs, which as explained earlier are approximately equivalent to the outputs of a set of M separate correlators, each having a different frequency shift $f_A$, where the values of $f_A$ are $$f_{Ak}=k\,f_{STEP}, \text{ for } k=-M/2, \ldots (M/2)-1 \qquad (10)$$

In order to achieve the highest processing gain and therefore greatest detection sensitivity it is necessary to coherently combine the results from all the sub-channels. This must be done separately for each possible frequency shift, $f_{Ak}$, since the effect of a frequency shift $f_{Ak}$ on the input signal is to cause a frequency shift $f_{Ak}$ to all sub-channels. The coherent combining process must therefore take as input the corresponding outputs, that is the outputs with index k (where k ranges from $-M/2, \ldots (M/2)-1$) from each sub-channel DTFT.

To explain the necessary coherent combining process, consider initially the case where there is no input frequency shift (that is, k=0). As mentioned earlier, the signal is modulated onto a carrier frequency, $f_{CARR}$, for transmission as a radio wave. This frequency, $f_{CARR}$, is subtracted in the initial stages of the receiver. Therefore a sub-channel with centre frequency equal to zero in our analysis was in fact transmitted with centre frequency equal to $f_{CARR}$. Similarly a sub-channel with centre frequency equal to $f_{SUBCARR}$ in our analysis was in fact transmitted with centre frequency equal to $f_{CARR}+f_{SUBCARR}$.

If the propagation delay is $\tau$ seconds, the phase of a radio wave at frequency f is shifted in phase by $\exp(-j2\pi f\tau)$ radians. Hence the phase shift of the sub-channel with centre frequency equal to zero is $\exp(-j2\pi\,f_{CARR}\,\tau)$ radians, while the phase shift of the sub-channel with centre frequency equal to $f_{SUBCARR}$ is $\exp(-j2\pi\,(f_{CARR}+f_{SUBCARR})\tau)$ radians. The delay search process in the receiver is intended to detect the presence of the reference signal in the input signal by applying a matching delay to the reference signal in the receiver before correlating. However, even the applied delay which is closest in value to $\tau$ is in general not exactly equal to it, leaving a small residual delay, $\tau_R$ seconds. Correspondingly, there are phase shifts in each sub-channel equal to $\exp(-j2\pi\,(f_{CARR}+f_{SUBCARR})\tau_R)$ radians. We can ignore the phase shift that is common to all sub-channels, $\exp(-j2\pi\,f_{CARR}\,\tau_R)$ radians; this is known as the carrier phase shift, and is present in all radio systems. That leaves a relative phase shift which is a function of the residual delay and the sub-channel frequency, $\exp(-j2\pi\,f_{SUBCARR}\,\tau_R)$ radians.

In order to combine the sub-channels coherently, these phase shifts must be cancelled before adding the sub-channel outputs together. If the value of $\tau_R$ were known, the cancellation would require applying a phase shift $\exp(+j2\pi\,f_{SUBCARR}\,\tau_R)$ to each sub-channel, where $f_{SUBCARR}$ is the centre frequency of that sub-channel. Assuming that the subcarriers are equally spaced in frequency, with frequency spacing $\Delta f_{SUB}$, the subcarrier frequencies may be written as $f_{SUBCARR(q)}=q\,\Delta f_{SUB}$, with q an integer, so the required phase shifts are $\exp(j2\pi q\Delta f_{SUB}\tau_R)$. If the subcarrier outputs (at common frequency k) are labelled $S_q^k$, then the required coherent combination output is the sum over all subcarriers of $S_q^k \exp(j2\pi q\Delta f_{SUB}\tau_R)$. This function is the Discrete Time Fourier Transform of an input vector formed from the subcarrier outputs $S_q^k$, evaluated at the signal radian frequency $\Delta f_{SUB} \tau_R$.

However, the value of $\tau_R$ is unknown. The solution is to define a set of candidate values of $\tau_R$ and compute the DTFT coherent combination at each candidate value. The required spacing of the candidate values of $\tau_R$ is determined by analysis to ensure that the worst case loss of detection performance is sufficiently small. The total number of DTFT outputs which need to be computed is then equal the delay spacing between correlations divided by the spacing between values of $\tau_R$.

There is thus a bank of M common DTFTs. The bank of M common DTFTs each with N outputs therefore provides an N by M array of outputs. A peak within this array above some predetermined threshold indicates a successfully acquired signal, with the position of the peak on the M-axis being indicative of the Doppler (or Doppler-like) shift applied to the signal. The position of the peak on the N-axis indicates the residual delay $\tau_R$ between the true correlation peak and the actual delay applied to the correlation.

Thus, the method may further include the step of examining the outputs of the M common DTFTs to identify, as indicated by a largest output, the particular DTFT corresponding to a Doppler or Doppler-like shift in the received signal, and hence the frequency shift of the signal.

As explained above, the rate at which correlations are computed during acquisition is typically two correlations per chip duration. Thus, the sample selection process of step (iii) is arranged to select accordingly, which results in a significant reduction in sample rate from the original input signal digitisation rate.

Tracking

Once the signal has been successfully acquired, as described above, then the process will generally switch to a tracking mode. This involves obtaining a precise measurement of the spreading code delay (as compared to that from another channel, or to an internal clock). In GNSS applications, better precision at this stage equates directly to an improved positional accuracy.

Advantageously, the selection of the sub-set of samples may employ "nearest-neighbour sampling" of the incoming signal, within each sub-channel. In this approach, the input sample stream from the digitiser comprises a plurality (such as approximately 4, 8, 16 or 32) of samples of each chip, at differing points thereon as compared to the sample points on an adjacent chip, and to have a sample rate that is not an integer multiple of the chip rate. The samples are then processed by a sample selection unit (SSU) arranged to select, for input to each tap of the correlator, the sample output nearest in time to a desired ideal time in relation to a timing reference point on the chip. This "nearest neighbour selection" approach is described further in International patent application No. WO2015/107111 mentioned above, which is incorporated by reference. It results in a much improved autocorrelation function characteristic, compared to a system in which the sampling rate is an integer multiple of the chip rate.

It will be appreciated that, when the receiver is in the tracking phase of operation, the hop pattern of the incoming signal is known. Therefore, the need for the buffer structure described in relation to the correlators in each sub-channel is not necessary. Instead, each sub-channel may advantageously be arranged to store and correlate just the incoming data that coincides with the presence of a reference signal in that sub-channel. This makes possible some savings of processing resource (for example hardware or firmware), as illustrated later. Also the frequency offset is known (with only small error), so it can be removed before correlation; there is therefore no need for a segmented correlator approach. The correlation results for each sub-channel must still be held in separate stores, however, because the delay is substantially, but not exactly, known. Hence there may be a small residual delay $\tau_R$ and the phase relationship necessary to coherently combine the sub-channel results using the DTFT is not exactly known. Therefore on completion of the whole correlation in each sub-channel, the sub-correlation outputs are fed into a common DTFT, but since the residual delay $\tau_R$ is small, it is, in many embodiments, only necessary to generate a very few outputs having residual delays close to zero. The common DTFT typically may be arranged to provide 3 outputs at this stage, at any given time, which correspond to slightly different time delay outputs. The different time delay outputs may correspond to the well-known Early (E), Prompt (P) and Late (L) outputs of a correlation process typically used in delay tracking loops in GNSS applications. Some embodiments may have more than three outputs. For example, some may have five outputs, comprising a Prompt output, two Early outputs each having a different time delay relative to the Prompt output, and two different Late outputs, again each having a different time delay relative to the Prompt output. The time delay between adjacent outputs may be between 0.05 and 0.7, more typically between 0.2 and 0.5, and more typically 0.5 of the half power width of a main lobe of the autocorrelation of the expected input signal. Other embodiments may have more than five outputs of the common DTFT or have different time spacings therebetween.

As in existing communications and GNSS receivers, the carrier frequency of the received signal may be tracked by measuring the phase angle of the Prompt output of each such correlation, and feeding the result into a Phase Locked Loop (PLL).

The DTFT processes may be arranged to have output samples spaced at a finer resolution than that which would be obtained from, say, an FFT. Well known techniques, such as zero padding the inputs, or the CORDIC algorithm may be used to increase the output resolution as desired.

It will be appreciated that the aspects of the invention may be implemented in hardware or in software. For example, one or more FPGAs or ASICs may be programmed to carry out the steps of the invention, or alternatively, some or all of the process steps may be carried out on one or more general purpose digital signal processors, or the like.

It will be understood that the application of frequency hopping means that the bandwidth of the signal is significantly increased. Prior to acquisition, the time alignment of the hops is not known, so it necessary for the receiver to sample the wideband signal at a proportionately high rate (to meet Nyquist's sampling criterion). The result is that for a given duration of reference signal (where the duration is chosen in order to achieve sufficient detection sensitivity) each correlation must process a proportionally larger number of samples. To achieve the greatest detection sensitivity, as has already been explained, coherent rather than incoherent correlation should be used, and there is a further consequence of the wide bandwidth of the signal, as explained above, which is that the correlation peak is proportionally narrower. This makes it necessary to compute correlation outputs at closer time intervals (in other words, more often); typically the interval between successive correlations is between 0.25 and 0.5 times the correlation peak width. If a prior art correlation method is used, then since both of these factors are proportional to the signal bandwidth, the overall computation load of those acquisition correlation methods already described increases in proportion to the square of the signal bandwidth. The invention as described herein allows the computational load to be reduced, as compared to the known prior art.

The invention extends to a system arranged to implement the methods of the present invention. The system may be implemented in hardware or software, or some combination thereof. Thus, typically, ASICs, FPGAs and/or DSP devices may be used in an implementation of the invention, The system may also further comprise means for converting received analogue signals into digital format, e,g. using one or more analogue to digital converters. The system may include one or more correlators, filters, samplers, phase discriminators, numerically controlled oscillators, multipliers, accumulators, Fourier transformers, phase-locked loops, delay locked loops, frequency mixers, as necessary to implement the processing steps, The system may further include memory (which may be included within the above processing devices, or be separate from them) for storing digital data in various stages within the processing steps outlined above.

The system may be a satellite navigation system. Advantageously, the system may be arranged to implement the steps outlined above upon signals from a plurality of satellites, and may use the outputs from the processing steps outlined above from multiple satellites to provide a navigational fix.

The system may form part of a data communication system.

The invention will now be described, by way of example only, with reference to the following figures, of which:

Figure 1:
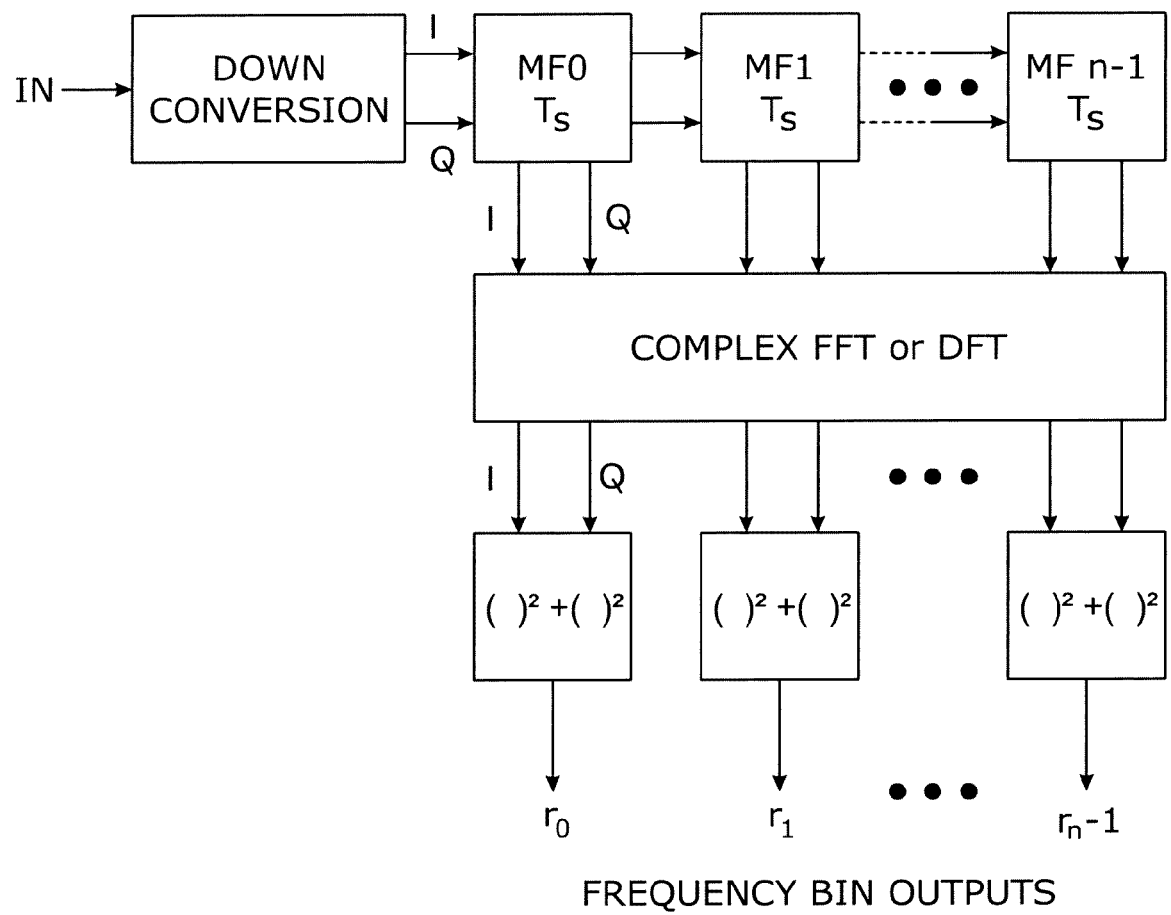
FIG. 1 shows a segmented correlator of the prior art.

FIG. 1 has been described previously.

Figure 2:
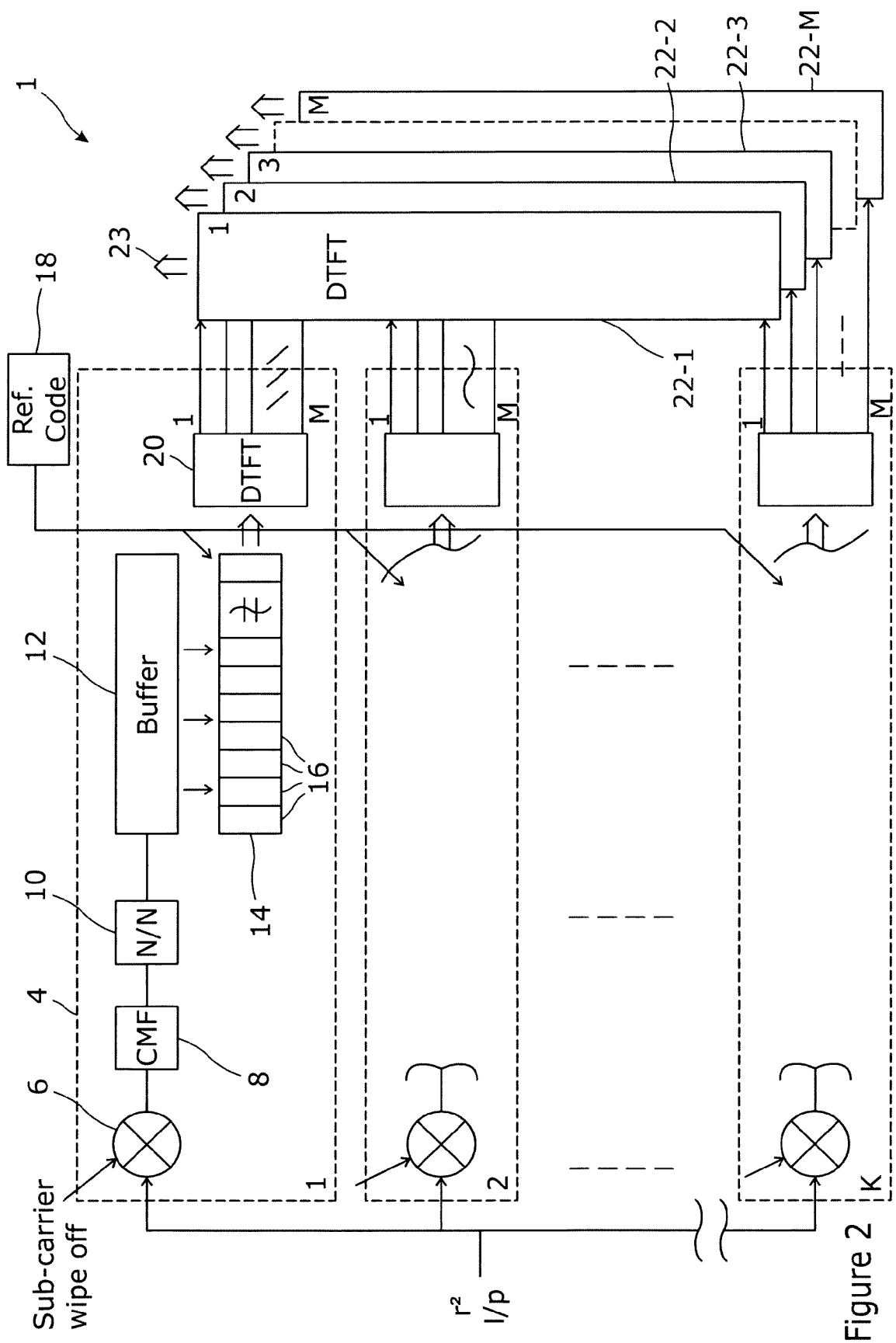
FIG. 2, shows a top level block diagram of an embodiment of the invention.

FIG. 2 shows an embodiment of the present invention, for processing a frequency hopped spread spectrum signal containing spreading codes. A signal processor 1 along with signal flows are shown in simplified form. A pre-digitised input signal 2 is provided to each of k input sub-channels, e.g. as indicated by dashed box 4. The input signal 2 has a frequency band defined by the spreading code and the frequency hop bandwidth B. Each sub-channel 4 is substantially similar in its processing arrangement, but is arranged to process a separate frequency band within the band of the input signal. Thus, given k sub-channels, each sub-channel will process a band of size B/k. Conveniently, but not necessarily, the number k of sub-channels will correspond to the number of discrete frequency hops employed in the received signal 2.

Within each sub-channel e.g. 4, the processing is as follows. The input is mixed, in a digital multiplier 6 with a signal that subtracts the hop frequency associated with the given sub-channel from the input, to provide a baseband output for further processing. The baseband signal is then filtered using a chip-matched filter 8, and the resulting output sub-sampled at 10 to reduce the sample rate. The sub-sampler 10 is a nearest neighbour (N/N) sampler, that selects the sample nearest in time (either in front of, or behind), an absolute reference time, relative to the start of the chip. The rate at which the sub-sampler provides output samples depends upon whether the processor is currently in an acquisition mode or a tracking mode. During acquisition, this embodiment provides two samples per chip duration to its output, and during tracking it supplies a single sample per chip, although it will be appreciated that other embodiments may provide more samples, during each mode.

The outputs from the N/N sampler 10 are provided to a buffer 12 that stores a plurality of contiguous samples. The size of the buffer 12 affects the degree of processing gain that will be achieved by the subsequent correlation process. Hence, a larger buffer will provide increased correlation gain, at the cost of an increased processing load. A smaller buffer will clearly have commensurate effects. In this embodiment, the buffer is chosen to hold samples from a time period equal to that of the length of the reference signal. The buffer 12 provides its data—as required—to a segmented correlator 14. This acts as a series of sub-correlators 16, that each receive a contiguous sub-set of the data in the buffer and correlate the sub-set with a corresponding sub-set of the reference code, provided by a reference code generator 18. Each sub-correlator produces a single complex output value.

As the receiver is aware of the expected signal that (during the acquisition phase) it is searching for, only those segments that are assumed to contain a valid signal (as determined by the presence of the reference signal within that segment) need be correlated. Therefore some sub-correlators, those that process segments during which there is no reference signal in that sub-channel, output a value of zero. The results of the correlations, from all of the segment sub-correlators are provided to a sub-channel DTFT 20 having M outputs. The frequency spacing of the outputs of the sub-channel DTFT 20 is chosen to ensure that the worst case processing loss is acceptably small, as explained earlier.

The M outputs of the sub-channel DTFT are fed to corresponding inputs of M channel-wide (i.e. common to the whole channel) DTFTs 22-1 to 22-M. Thus, each of the M sub-channel DTFT outputs from a given sub-channel is provided to a different common DTFT 22.

Each of the common DTFTs 22 provide a plurality of outputs 23. The outputs from a given common DTFT represent the results of a correlation across the whole of the bandwidth B, for a particular input frequency offset, as may be caused by Doppler, (including Doppler-like) frequency variations on the input signal 2, and for a chosen set of small delay offsets (referred to above as "residual delays") relative to the delay used for the correlations. Therefore, the 2D array of outputs from the M common DTFTs provides a correlation across the whole Doppler bandwidth and on a fine grid of delay offsets. A peak search across the array is performed, and if a peak above some predetermined threshold is found, this indicates a successful acquisition of the input signal 2.

To achieve good performance, the combined sub-channel correlator approach described above should achieve the same correlation (processing) gain as a traditional wideband correlator. For this to occur, the corresponding sub-channel DTFT outputs at each frequency (i.e., the equivalent outputs from each sub-channel DTFT) should be combined coherently. The common DTFT achieves this.

Note that the architecture comprising the array of sub-channel DTFTs, together with the common DTFTs, equates to a 2D DTFT—for which a number of processing architectures exist. The normally skilled person will therefore be familiar with efficient architectures to employ.

Figure 3:
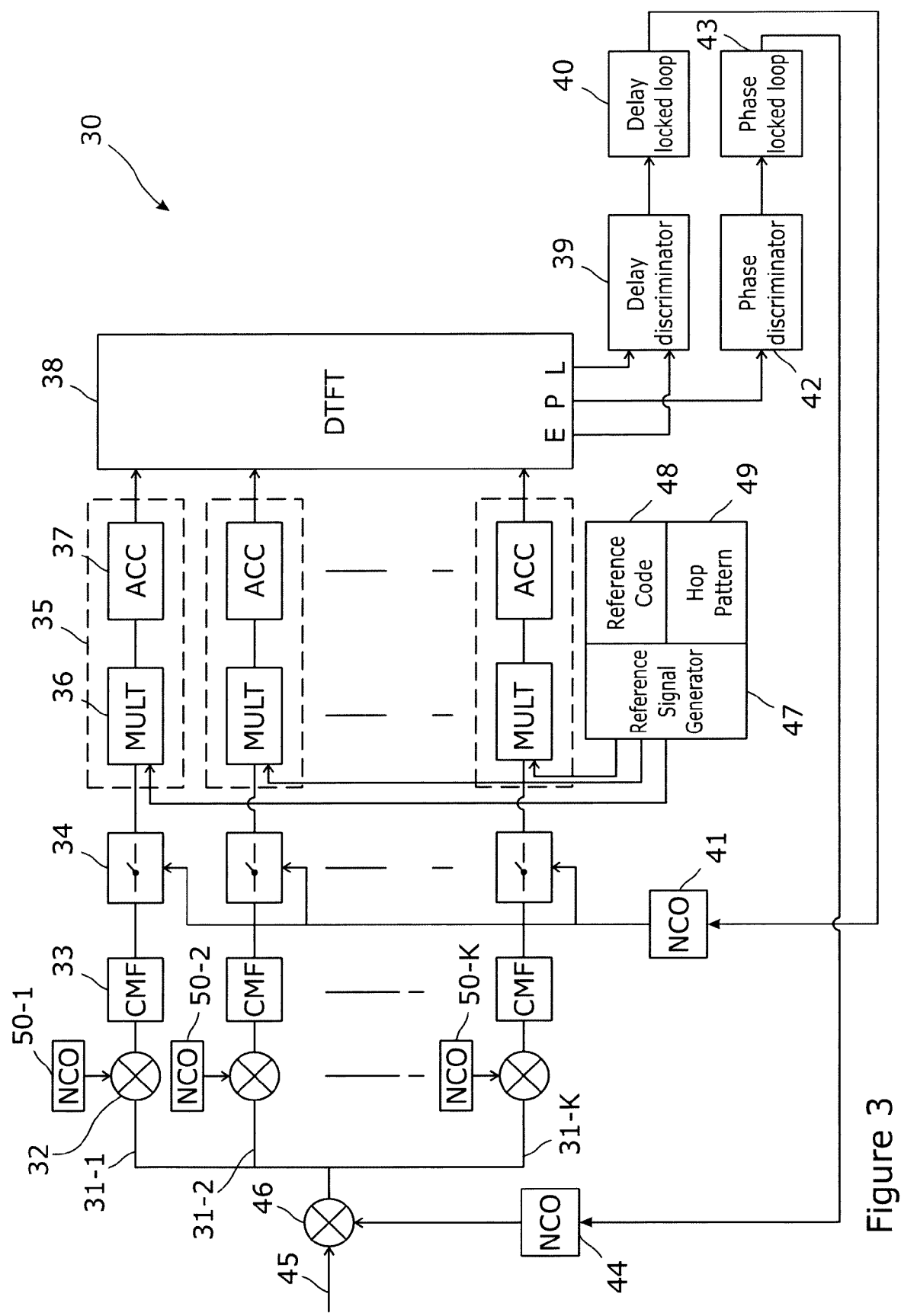
FIG. 3 shows a simplified block diagram of an embodiment of the invention when in a tracking mode of operation, along with surrounding feedback processes not shown in the previous figure.

Following acquisition, as explained above, the process enters a tracking mode. FIG. 3 shows an embodiment of the present invention, for tracking a frequency hopped spread spectrum signal containing spreading codes. When in the tracking mode, the task of the receiver is to measure the time delay (relative to some reference time or signal) of the peak found during acquisition.

The embodiment comprises a receiver 30 that is configured to have a set of sub-channels 31-(1-K), in this case there being a separate sub-channel for each hop frequency of the input signal, although this is not a necessity, as described earlier. Each sub-channel 31-$k$ (where (small) k denotes an individual channel) has a mixer 32 which takes the sub-channel input signal in a first input, and the output from a Numerically Controlled Oscillator 50-$k$ arranged to produce a complex sinewave at the channel centre frequency, that feeds a second input of the mixer 32 to bring the input signal in that sub-channel down to baseband, and a CMF 33 to allow the sample rate in the sub-channel to be reduced, without any loss of sensitivity. The output of the CMF 33 is sampled by the sample selection unit 34, and the chosen samples are provided to a correlator 35 for correlating input signals in the sub-channel with a known reference code. The sample selection unit 34 chooses only those samples which are required to compute the correlations required for tracking.

In particular, the receiver knows the hop pattern and the reference code, and therefore knows which samples from each hop frequency form part of the frequency hopped signal. Therefore only the required samples from each sub-channel are selected by the sample selection unit 34. They are then multiplied in multiplier 36 by the conjugate of the corresponding samples of the reference sequence and the results are accumulated in an accumulator store 37. The final result in the store is the required correlation. For each sub-channel there may be more than one such store, used to accumulate different correlation results for different delay values, but typically only one is required.

An output of the correlator 35 from each sub-channel is fed to a common DTFT 38. During tracking, the number of outputs of the common DTFT that need to be calculated can be reduced. Typically three may be used, corresponding to an Early, a Prompt, and a Late output, which are then processed in traditional fashion as would be known to a person skilled in the art. The calculation of the common DTFT may be tailored just to produce these three outputs at a suitable delay spacing that avoids missing the correlation peak. To achieve this the three outputs of the DTFT may typically be chosen to be separated in time from the adjacent outputs by approximately half the width of the correlation peak (or 1/(2B), where B is the bandwidth of the whole signal). This corresponds to spacings of half a chip duration in a conventional BPSK tracker. However, as is well known to a person skilled in the art, the spacing may be chosen to be wider or more commonly narrower, for example to mitigate the effects of multipath. This is described for example in Mohammad Zahidul H. Bhuiyan and Elena Simona Lohan (2012). *Multipath Mitigation Techniques for Satellite-Based Positioning Applications, Global Navigation Satellite Systems: Signal, Theory and Applications,* Prof. Shuanggen Jin (Ed.), ISBN: 978-953-307-843-4, InTech, Chapter 17, pp 405-426 (Bhuiyan). Just as correlator spacings in the range of 0.05 to 0.2 chips might be used in a conventional BPSK tracker (Bhuiyan, page 405), so the three outputs of the DTFT may be chosen to be separated in time from the adjacent outputs by approximately 0.05 to 0.2 times the width of the correlation peak. Of course, other time spacings outside of this range may be used, for multipath mitigation or for other purposes.

Furthermore, other well-known techniques for combatting multipath (including the Double-Delta technique (Bhuiyan p 406, and p 412-13)), use more than 3 correlator outputs in the tracking loop. To achieve this the DTFT would be tailored to provide the required more than 3 outputs. The Double Delta technique typically uses 5 correlator outputs— two early, two late, and a prompt output. Other techniques, such as are described in Bhuiyan may require more correlator outputs, The required additional outputs can be provided by suitable configuration of the DTFT as would be understood by the normally skilled person.

As is conventional in GNSS receivers, the early and late signals are fed to a delay discriminator 39 which provides an estimate of the delay error to a delay locked loop (DLL) 40. The delay locked loop includes a numerically controlled oscillator (NCO) 41 which drives the sampler(s) 34 on each sub-channel, selecting the sample times to be used to sample the incoming decimated signal. The Prompt correlator output is fed to a phase discriminator 42 which provides input to a Carrier Frequency Phase Locked Loop (PLL) 43, that has an NCO 44, the output of which is used to mix with the incoming signal 45 using a multiplier 46. As is conventional in both GNSS and communications receivers, this NCO 44 together with the multiplier 46 removes any frequency offset from the input signal by shifting the frequency of the input signal by the negative of the current estimate of the signal's frequency offset. This is called "carrier wipeoff".

Looking back to FIG. 2, it will be recalled that the correlator there is operating as a segmented correlator (so as to be able to handle the unknown Doppler frequency offset of the input signal during acquisition), whereas, when the system is operative in a tracking mode (as illustrated in FIG. 3), the correlator may switch to a non-segmented correlator (suitable when the residual frequency offset of the input signal is sufficiently small, as it is during tracking), that provides one (complex) output. In this case, the correlation process is as described by equation 3. This may be seen as a segmented correlator with just one segment (M=1), and the result undergoing a single point DTFT, which is a trivial function for which the output is the same as the input).

The reference sequence which must be provided to the correlator for a given sub-channel 31-$k$ is equal to the original reference sequence (as generated in the transmitter, prior to frequency hopping) during those periods of time when the hop frequency causes the signal to be within sub-channel k. At other times, the reference sequence for sub-channel k is zero. The process of generating the reference sequences for each sub-channel from the original reference sequence is carried out by a reference generation unit 47, with inputs from the local copies of both the chip reference code 48 and the hop pattern (i.e. the pattern of hop frequencies) 49. With its knowledge of both the chip sequence and the hop pattern, it is able to direct the appropriate parts of the chip sequence to the correct sub-channel correlators for correlation with the input signal on that sub-channel at the appropriate times.

Equation 3 shows that each sub-channel correlation operation comprises a multiplicity of multiplication operations, whose results are summed to provide the single output result. In FIG. 3, for later clarity, these two aspects are shown separately, the multiplication unit 36 feeding its outputs to the accumulation unit 37.

In FIG. 3, as has already been mentioned, only one correlation multiplication unit 36 is active at any one time, because only one hop frequency is active at any one time.

Figure 4:
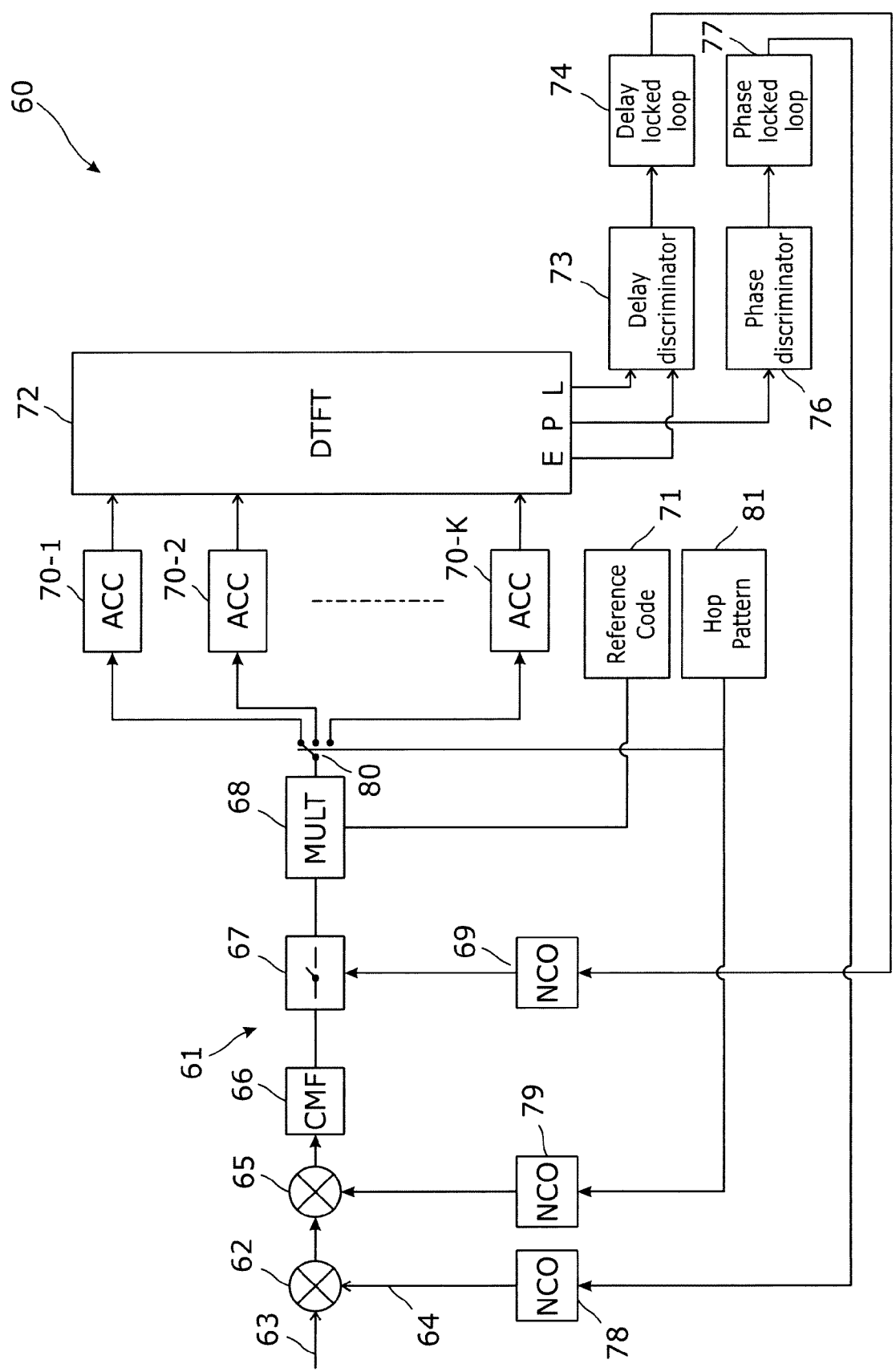
FIG. 4 shows an alternative configuration for operation when in a tracking mode.

Thus, this may be exploited to simplify the processing configuration required, and hence reduce power and hardware, firmware and/or software requirements, during the tracking phase. FIG. 4 shows an embodiment having such reduced configuration.

The embodiment 60 comprises apparatus for processing a frequency hopping code modulated signal in a tracking mode. Thus, it is assumed that the signal has been acquired, and knowledge of the timing of the code and hopping pattern has been gained during a previous acquisition phase. The apparatus has a processing channel 61 having an input digital mixer 62 that receives a digitised input signal on one input 63, and a further "carrier wipeoff" 64 that will be described later. The output of the input mixer 62 is a signal having a bandwidth dictated by both the code and the hopping frequency. This signal is applied to a first input of a hop frequency wipeoff mixer 65. The apparatus has a hop pattern generator 81 that is now (following the acquisition phase) in synchronisation with the incoming hopping pattern. The hop pattern generator 81 generates inverse copies of the incoming frequency at a given instant using NCO 79, which is provided to a second input of the hop frequency wipeoff mixer 65. The output of this mixer 65 is therefore a baseband signal bearing just the code modulation.

This signal is filtered in CMF 66 and then sampled by sampler 67 and the samples therefrom fed into a correlator multiplier 68. The sampler 67 is driven by an NCO 69 as is described later, and the multiplier 68 is fed with the current chip from the chip reference code 71. The output of the multiplier 68 is switched, using switch 80 to a different accumulator 70 for each sub-channel. The switch 80 is controlled by the hop pattern generator 81.

Each accumulator 70 accumulates the results of the multiplication of the input signal (processed as described above) with the stored reference code 71. The output from each accumulator is provided to a common DTFT 72, which functions in an identical manner to the common DTFT of FIG. 3, The common DTFT 72 has three outputs—Early, Prompt and Late, as before, and these are again arranged to have relative time delay between adjacent outputs of approximately half the width of the correlation peak. As in the embodiment of FIG. 3, the Early and Late outputs go to a delay discriminator 73, and from there to a DLL 74, which feeds an NCO 69. Whereas in FIG. 3 the NCO was used to clock the sampler on each of the different sub-channels, here, the NCO 69 output clocks only the single sampler 67 on the single sub-channel 61.

The Prompt output from the common DTFT feeds a phase discriminator 76 which in turn feeds a PLL 77 which drives an NCO 78 that is used to produce a signal equal in frequency to the incoming signal. This NCO signal is mixed with the incoming signal in digital mixer 62 to effect the carrier wipe-off function mentioned above.

This embodiment therefore requires only a single CMF, sampler, and, for the correlation function, a single multiplier to be used during the tracking phase. It means that only a single hardware, firmware or software instance of these aspects of the processing needs to be provided, as shown in FIG. 4. However the accumulation units 70 (which hold the correlation results for each sub-channel) still need to be separate, as has already been explained.

Once the signal has been acquired, during an acquisition phase, both the time delay of the signal and its frequency offset are known with only small error. This reconfiguration therefore results in a reduced processing requirement and hence provides a reduced power consumption during the tracking phase, as compared to the embodiment shown in FIG. 3.

The above examples and embodiments are not limiting, and it will be appreciated that various modifications and amendments to the embodiments, methods and processes described can be made, whilst still falling within the scope of the claims. It will also be understood that, where appropriate, the various functions and processes described herein may be implemented in hardware or software, or some combination of the two, according to the requirements and capabilities of the embodiments. The hardware may comprise of one or more signal processors, FPGAs, and/or ASICs appropriately configured or programmed to implement the various process steps described.

The invention claimed is:

1. A method for processing a signal in a receiver, the signal comprising of a frequency hopped signal multiplied by a spreading code comprising a sequence of chips, and the method comprising acquiring a signal by carrying out the steps of:
    a) splitting the received signal into a plurality (k) of separate processing sub-channels, each corresponding to one or more hop frequencies;
    b) within each sub-channel:
        i) subtracting any sub-carrier frequency from the received signal;
        ii) filtering the signal from (i) using a chip-matched filter;
        iii) selecting a sub-set of samples from the filtered signal; and
        iv) correlating the sampled signal from step (iii) with a known reference signal to produce at least one correlator output, the reference signal comprising a spreading code;
    c) providing one or more outputs from each sub-channel into an input of a corresponding one or more common discrete time Fourier transforms (DTFT); and
    d) selecting one or more outputs of the common DTFT(s) of stage (c) having a peak above a predetermined threshold for further processing in the receiver.

2. The method as claimed in claim 1,
    wherein, during at least an acquisition mode, the samples produced at stage (iii) are stored in a buffer, and
    wherein the correlator is arranged to correlate data from the buffer that corresponds to data from the reference code for the given sub-channel.

3. The method as claimed in claim 2, wherein the buffer is updated with each latest input from the sub-sampling step, and the oldest sample discarded, and the correlation is repeated each time the buffer is thus updated.

4. The method as claimed in claim 2,
    wherein the correlator is a segmented correlator, that has a plurality of separate sub-correlators, each arranged to correlate a contiguous sub-set of the data within the buffer, and
    wherein each sub-correlator provides its output to a sub-channel DTFT, and further wherein the outputs of the sub-channel DTFT comprise the outputs of the sub-channel.

5. The method as claimed in claim 4, wherein a bank of M common DTFTs are used, each arranged to accept the corresponding output from the sub-channel DTFTs.

6. he method as claimed in claim 5, wherein the outputs of the M common DTFTs are examined to identify, as indicated by a largest output above a predetermined threshold, the particular common DTFT corresponding to a Doppler shift in the received signal.

7. The method as claimed in claim 6, wherein the common DTFT(s) are arranged to have a time spacing between adjacent outputs of between 0.05 and 0.7, more typically between 0.2 and 0.5, and more typically 0.5 of the half power width of a main lobe of an autocorrelation of an expected input signal.

8. A method of processing an input signal comprising:
first acquiring the signal according to claim 1; and
then, once the signal is acquired, switching to a tracking mode wherein at least one correlator is used, the at least one correlator providing a single complex output for each sub-channel to a single common DTFT, and using outputs of the single common DTFT to track and compensate for variations in input frequency and delay.

9. The method as claimed in claim 8, wherein a single processing channel is used to process the input signal up until a correlation accumulation stage, wherein a separate accumulation is performed for each sub-channel, and wherein a phase locked loop driven by a Prompt output of the common DTFT is used to remove any Doppler or Doppler-like frequencies from the input signal.

10. The method as claimed in claim 9, wherein the common DTFT has one or more outputs tailored to provide a measurement of the delay of the output peak in relation to a reference signal.

11. The method as claimed in claim 10, wherein the common DTFT outputs comprise an Early, a Prompt and a Late output, and wherein the Prompt output is used by the phase locked loop to remove the Doppler or Doppler-like frequencies within the processing channel.

12. The method as claimed in claim 11, wherein the Early and Late outputs are used to drive a delay locked loop, which is used to control the timing of sampling of input signal chips.

13. The method as claimed in claim 8, wherein a reference hop pattern is used to remove hop frequencies from the input signal to allow chip-matched filtering, sampling, and multiplication with a reference code to be performed at a single baseband frequency.

14. The method as claimed in claim 11, wherein the common DTFT has at least five outputs, comprising at least two Early outputs, at least two Late outputs, and a Prompt output.

15. The method as claimed in claim 14, wherein the common DTFT is arranged to have a time spacing between adjacent outputs of between 0.05 and 0.7, more typically between 0.2 and 0.5, and more typically 0.5 of the half power width of a main lobe of an autocorrelation of an expected input signal.

16. The method as claimed in claim 1, wherein the number of common DTFT outputs on each common DTFT comprises 1, 2 or 3 outputs.

17. The method as claimed in claim 1, wherein each sub-channel is arranged to receive a single hop frequency, and the subtraction in step (b)(i) comprises multiplication with a complex exponential to bring the signal to zero frequency.

18. The method as claimed in claim 1, wherein each sub-channel is arranged to receive a plurality of hop frequencies, and the subtraction in step (b)(i) comprises multiplication with multiple complex exponentials to bring the signal to zero frequency.

19. An apparatus arranged to implement the method as claimed in claim 1.

20. A satellite navigation system comprising the apparatus of claim 19.

* * * * *